(12) United States Patent
Fux

(10) Patent No.: US 9,482,466 B2
(45) Date of Patent: Nov. 1, 2016

(54) METHOD FOR DRYING BULK MATERIAL

(75) Inventor: Erhard Fux, Vienna (AT)

(73) Assignee: WITTMANN KUNSTSTOFFGERAETE GMBH, Vienna (AT)

( * ) Notice: Subject to any disclaimer, the term of this patent is extended or adjusted under 35 U.S.C. 154(b) by 37 days.

(21) Appl. No.: 13/582,302

(22) PCT Filed: Mar. 2, 2011

(86) PCT No.: PCT/AT2011/000102
§ 371 (c)(1),
(2), (4) Date: Aug. 31, 2012

(87) PCT Pub. No.: WO2011/106812
PCT Pub. Date: Sep. 9, 2011

(65) Prior Publication Data
US 2013/0000143 A1    Jan. 3, 2013

(30) Foreign Application Priority Data

Mar. 3, 2010 (AT) .................................. 329/2010

(51) Int. Cl.
*F26B 21/08* (2006.01)
*B01D 53/06* (2006.01)
(Continued)

(52) U.S. Cl.
CPC ............ *F26B 21/083* (2013.01); *B01D 53/02* (2013.01); *B01D 53/06* (2013.01); *B01D 53/261* (2013.01)

(58) Field of Classification Search
CPC ... F26B 21/083; B01D 53/261; B01D 53/06; B01D 53/02
USPC ......... 34/443, 467, 472, 473, 474, 477, 109, 34/131, 500, 80, 209, 210, 213, 216, 217, 34/219, 242; 95/119, 121, 126, 113; 96/121, 125; 277/644, 647; 165/8, 9; 416/204 R, 207, 209, 214 R
See application file for complete search history.

(56) References Cited

U.S. PATENT DOCUMENTS 2,507,607 A * 5/1950 Miller .............................. 96/125
2,517,470 A * 8/1950 Erisman ......................... 285/9.2
(Continued)

FOREIGN PATENT DOCUMENTS

AT        505391       1/2009
DE        2025205      12/1971
(Continued)

OTHER PUBLICATIONS

English Machine Translation: AT 505391.*
(Continued)

*Primary Examiner* — Kenneth Rinehart
*Assistant Examiner* — Tavia Sullens
(74) *Attorney, Agent, or Firm* — Greenblum & Bernstein, P.L.C.

(57) ABSTRACT

The invention relates to a method for drying bulk goods, in particular solids, such as granular materials, powders, grains, films, shreds, or the like, preferably plastic granular material, in a drying silo (9) by means of an air flow. The exhaust air flow (5) that is discharged from the drying silo (9) is dried in a wheel dryer (1). The adsorbent is regenerated and cooled in the wheel dryer. A rotatable drum (2) of the wheel dryer (1) is divided into at least three wheel segments, wherein the region of a wheel segment is used for drying or dehumidifying the exhaust air flow, the region of the second wheel segment is used for heating the adsorbent, and the region of the third wheel segment is used for cooling the adsorbent. The drying or dehumidifying phase (14) for the exhaust air flow (5) and preferably the adsorbent cooling occur in parallel, in particular in a continuous manner during the operation. The regenerating phase (15) with the adsorbent heating is carried out at intervals during the operation. The drum (2) of the wheel dryer is stopped in the cooling (16) or regenerating phase (15) and advanced to a selectable region, preferably the cooling region, after the cooling (16) or regenerating phase (15) finishes.

18 Claims, 5 Drawing Sheets

(51) Int. Cl.
  *B01D 53/02* (2006.01)
  *B01D 53/26* (2006.01)

(56) References Cited

U.S. PATENT DOCUMENTS

| | | | | |
|---|---|---|---|---|
| 2,617,986 | A * | 11/1952 | Miller | 96/125 |
| 2,713,728 | A * | 7/1955 | Cassells | F26B 11/024 |
| | | | | 34/242 |
| 3,115,334 | A * | 12/1963 | Schauss | B01F 3/04765 |
| | | | | 261/DIG. 71 |
| 3,915,220 | A * | 10/1975 | Gibson | F28D 19/044 |
| | | | | 165/10 |
| 4,345,640 | A | 8/1982 | Cullinan | |
| 4,702,312 | A * | 10/1987 | Brown | 165/179 |
| 4,926,618 | A * | 5/1990 | Ratliff | B01D 53/06 |
| | | | | 95/10 |
| 5,169,414 | A | 12/1992 | Panzica et al. | |
| 5,566,468 | A | 10/1996 | Graeff | |
| 5,659,974 | A * | 8/1997 | Graeff | 34/474 |
| 5,688,305 | A | 11/1997 | Graeff | |
| 5,915,816 | A | 6/1999 | Gräff | |
| 6,257,318 | B1 | 7/2001 | Fierle et al. | |
| 6,315,298 | B1 * | 11/2001 | Kildea | F01D 11/006 |
| | | | | 277/433 |
| 6,543,520 | B2 * | 4/2003 | Larkin et al. | 165/9 |
| 7,090,459 | B2 * | 8/2006 | Bhate | F01D 11/025 |
| | | | | 277/581 |
| 7,686,612 | B1 * | 3/2010 | Buteau | 432/115 |
| 2010/0205821 | A1 * | 8/2010 | Tada et al. | 34/428 |

FOREIGN PATENT DOCUMENTS

| | | |
|---|---|---|
| DE | 3625013 | 1/1988 |
| DE | 19757537 | 7/1999 |
| DE | 10118762 | 10/2002 |
| EP | 0162537 | 11/1985 |
| EP | 0626244 | 11/1994 |
| EP | 0712656 | 5/1996 |
| EP | 740956 | 11/1996 |
| EP | 0805010 | 11/1997 |
| WO | WO 2009020042 A1 * | 2/2009 |

OTHER PUBLICATIONS

Dessicant Chart Comparison: <https://sorbentsystems.com/dessicants_charts.html>. Accessed Mar. 21, 2015.*

* cited by examiner

METHOD FOR DRYING BULK MATERIAL

CROSS-REFERENCE TO RELATED APPLICATIONS

The present application is a U.S. National Stage of International Patent Application No. PCT/AT2011/000102 filed Mar. 2, 2011, and claims priority of Austrian Patent Application No. A 329/2010 filed Mar. 3, 2010.

BACKGROUND OF THE INVENTION

1. Field of the Invention

The invention relates to a method for drying bulk goods, in particular solids, such as granular materials, powders, grains, films, shreds, or the like, preferably plastic granular material, in a drying silo by an air flow. The exhaust air flow that is discharged from the drying silo or the returning air is dried in a drying cell, preferably a wheel dryer, that contains a drying or adsorbing agent and reintroduced to the bulk goods as drying air flow, and furthermore the adsorbent is regenerated and cooled in the wheel dryer, wherein a rotatable drum of the wheel dryer is divided into at least three wheel segments. The region of a wheel segment is used for drying or dehumidifying the exhaust air flow, the region of the second wheel segment is used for heating the adsorbent, and the region of the third wheel segment is used for cooling the adsorbent.

2. Discussion of Background Information

Various methods and devices are known for drying the returning air that exits from the drying silo.

DE 36 25 013 A1 shows one of these known methods. In the course of the known method, the exhaust air exiting from the drying funnel is dried in a dryer containing an adsorbing agent and returned to the bulk goods as drying air.

Furthermore, a method and a device for drying and heating air that serves for drying bulk goods is known from DE 197 57 537 A1. The device essentially comprises at least one drying cartridge or drying cell, a downstream air heater, a downstream dry goods chamber or drying silo and a downstream cooling device.

Furthermore, a method for regenerating humidity-laden process air is known from DE 101 18 762 A1. Thereby, the atmospheric air is heated up and introduced to the drying cartridge for regeneration. The subsequent cooling of the drying cartridge is achieved by a partial stream of air diverted from the dried process air.

A method for drying humid air is known from EP 0 712 656 B1, and a method and a device for regenerating an adsorbent, containing in particular humidity, from EP 740 956 A2.

Moreover, a device with multiple chambers for selective adsorption of molecules is known from DE 2 025 205 A1.

A device of the type explained above is known from AT 505 391 B1. In accordance with said device, the exhaust air flow is introduced to a feeding channel that is provided in the wheel dryer and connected with the adsorbent, diverted in the wheel dryer, conducted through the adsorbent and subsequently diverted again as drying air flow and removed in a discharging channel against the direction of flow in the feeding channel, and introduced to the drying silo. One disadvantage of said wheel dryer is that high pressures are necessary due to the high flow resistances resulting from the diversions.

All the abovementioned methods and apparatuses primarily have the disadvantages that the devices require a very complex design and a high consumption of energy for regenerating and drying is given in the case of said methods.

SUMMARY OF THE EMBODIMENTS

The aim of the invention is to create a method of the type mentioned above that on the one hand avoids the above disadvantages and on the other hand increases, globally seen, the economic efficiency, particularly in operation, both in the acquisition as well as during operation.

The method in accordance with the invention is characterized in that the drying or dehumidifying phase for the exhaust air flow and preferably the adsorbent cooling occur in parallel, in particular in a continuous manner during permanent operation, and the regenerating phase with the adsorbent heating is carried out at intervals during the operation. In this manner, the drum of the wheel dryer is stopped in the cooling or regenerating phase and advanced to a selectable region, preferably the cooling region, after the cooling or regenerating phase finishes, and that the heating region is defined at least equal to or greater, preferably double the amount, than the cooling region. With this method it is for the first time possible to minimise the energy consumption.

Zeolite requires a temperature of more than 200° C. for regenerating, thus for dehumidifying and drying. The higher the temperature was, the better the efficiency would be. Depending on temperature, time and air flow, a specific cost of energy is therefore necessary for regenerating a certain amount of zeolite. As a result, the optimal energy consumption can be determined based on the degree of humidity of the zeolite. An energy supply in excess of the saturation range is useless. However, there are limits to the height of the temperature in view of the temperature resistance of the machinery parts and components involved in the process, such as seals, which is at approximately 280° C.

As is generally known, the energy consumption of the drying process is determined very much by the heating output in the regenerating phase. The achievement of a constant dew point was in accordance with the methods belonging to the state of the art and their philosophy. In fulfilment of this requirement, the regenerating phase occurred during permanent operation.

In accordance with the philosophy underlying this invention, namely to at least maintain the quality standard of the drying air but increase the economic efficiency, a difference between heavily and less heavily loaded drying tasks is deliberately made in the drying method. Pursuant to the present method in accordance with the invention, the regenerating phase for less heavily loaded drying tasks is carried out at intervals during the operation as a result of this conclusion. This means that the heater for heating the adsorbent and, where applicable, the associated fan are switched off deliberately for a period of time. With this type of operation at intervals, the curve for the dew point deviates only insignificantly from the ideal curve, whereby however the deviation for the quality standard is unnoticeable.

Particularly in tropical areas, methods using cartridges for drying are out of favor due to the risk of leakage air. As a result, wheel dryers of the type mentioned above are used in these areas. In order to thus be able to run wheel dryers of this type even more economical in operation, the present method is applied. Wheel dryers generally have the advantage that they operate independently and leakage-free.

In accordance with a special feature of the invention, the drying or dehumidifying region amounts to approximately 240 arc degrees, the heating region amounts to approximately 80 arc degrees and the cooling region amounts to approximately 40 arc degrees. Based on this definition of regions, thus to double the regenerating region in comparison with the cooling region, the possibility is created to reduce the regenerating output period or heating output by 50%. The regenerating phase is only put into operation every second cooling phase. According to measurements in test operation, approximately 38% of the energy consumption of the system is saved using this economical method.

In accordance with another special feature of the invention, the air flow for cooling is branched off from the exhaust air flow after the drying or dehumidifying phase. As a result of this measure, the cooling effect can be improved due to the dry air. Possible re-humidification by outside air is avoided.

In accordance with an embodiment of the invention, a central region of the wheel dryer that is designed like a hollow shaft is used as heat exchanger, and a regeneration air flow required for regenerating the drying or adsorbing agent and produced in a regenerating fan is conducted through this hollow shaft before its entry into the wheel dryer. This ingenious, innovative embodiment results in another minimisation of the system's energy consumption.

In accordance with another embodiment of the invention, the wheel segments of the drum are divided into individual cells by radial partitions. This way, smaller spatial units are available in the procedure, as a result of which more optimal control or regulation of the overall process is achieved.

The aim of this invention is also to create a device for performing the method for drying bulk goods explained above that on the one hand avoids the disadvantages cited for the state of the art and on the other hand increases the economic efficiency of the system.

The device for performing—the method in accordance with the invention includes the drum of the wheel dryer having individual cells and the individual cells of the drum of the wheel dryer are formed by plates. Clamping plates of each cell lying against the radial outer and inner jackets of the drum have a U-shaped cross-section and are arranged axially on the inner wall and the legs of the U-shaped clamping plates are tilted outwardly, and separating plates provided as partitions of the individual cells are positioned by the clamping effect of adjacent legs of two U-shaped clamping plates lying against each other and seal off the cells from each other. With this invention, it is for the first time possible to unite a simple structural assembly with most simple material components, namely plates, into an absolutely economical solution with a functionality that also satisfies robust operation. The interior structure of the drum constructed from simple plates is not only subject to low wear, but naturally also requires little maintenance. By positioning the separating plates through the clamping effect, packingless axial sealing of the individual cells is achieved. It is also notable that rational, economic production is possible based on the processing of simple plates using simple sheet metal working machines. Another significant advantage of this plate structure inside the drum must be seen in the fact that all thermal expansions due to the temperature differences are absorbed by the elastic structure of the drum.

Another advantage of this plate structure must be seen in the fact that only the adsorbing agent itself needs to be disposed of on a dump in the event of any operationally necessary replacement of the adsorbent. The drum casing with its inner structure, in which the adsorbent is contained in operation, can be reused again naturally. Based on this refilling, an immense advantage is given in terms of environmental burden. Furthermore, the costs of any such renewal are reduced dramatically of course.

With this invention, impeccable quality with high reliability as well as consistent functionality with ingenious design is combined into optimal economic efficiency.

In accordance with a special embodiment of the invention, an amount of at least three, preferably six, in particular 36 cells are provided. This way, a continuous overall process is enabled in an advantageous way, whereby an optimal constant dew point is achieved throughout the operating time as a result of the small spatial units.

In accordance with another feature of the invention, the wheel dryer is divided into at least three wheel segments, wherein the region of one wheel segment serves for drying or dehumidifying the exhaust air flow, the region of the second wheel segment serves for heating the adsorbent, and the region of the third wheel segment serves for cooling the adsorbent. Due to this division into relevant drum regions, a minimization of the required space is achieved, as intermediate steps interrupting the procedure due to lines to the individual process steps are omitted. In addition, the energy balance of the overall process is also optimized as a result.

In accordance with another special feature of the invention, the wheel dryer is provided with one lid each at both axial ends, so that each lid includes the connections for the air conducts. A wheel dryer design of this type involves a linear through-flow for all air flows, as a result of which least pressure losses are given. In addition, the greatest possible cross-section is also used as active zone. As it is generally known, the residence time of the air should be longer and thus the flow velocity in the active zone minor. With this design of the wheel dryer it is possible to fulfill these conditions.

In accordance with a further embodiment of the invention, the two lids are stationary and a rotor disk with a seal, in particular a sandwich seal, is provided between the lids and the rotating drum.

In accordance with another special feature of the invention, the wheel dryer comprises a hollow shaft in its central region and this hollow shaft is provided as heat exchanger, where applicable filled with a wire cloth or stainless steel wool or the like. With this intelligent design, it is possible to save energy and increase the efficiency, as already explained above. In addition, the mentioned filling materials have proved their worth for the heat exchanger function.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

The figures show.

DETAILED DESCRIPTION OF THE EMBODIMENTS

Figure 1:
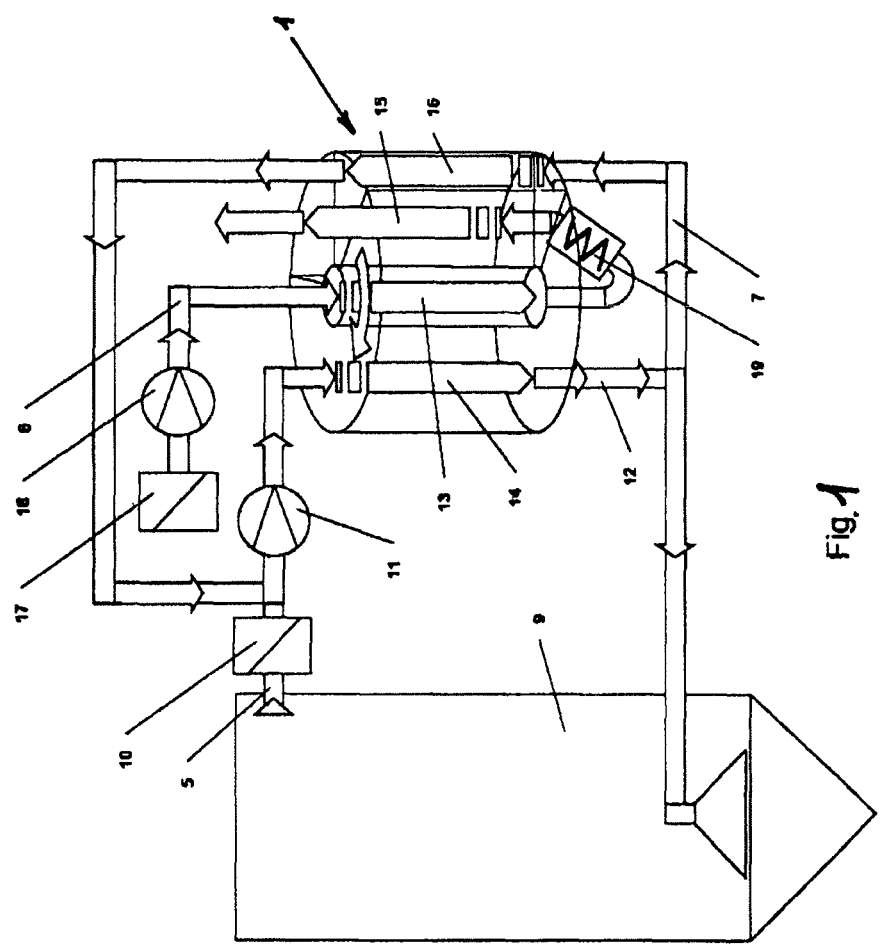
FIG. 1 schematics of the air conducts.

In accordance with FIG. 1, the air conducts for the method for drying bulk goods, in particular solids, such as granular materials, powders, grains, films, shreds, or the like, preferably plastic granular material, are shown schematically. The plastic granular material is dried in a drying silo 9 by an air flow. In order to dry the exhaust air flow 5 or the returning air exiting the drying silo 9 during the drying or dehumidifying phase 14, the exhaust air flow 5 is connected by a filter 10 and a process fan 11 to the wheel dryer 1 that contains a drying or adsorbing agent. The exhaust air flow 5 is dried in the wheel dryer 1. The exhaust air flow 5 is reintroduced to the drying silo 9 as drying air flow 12.

The adsorbing agent is regenerated in the regenerating phase 15 and subsequently cooled in the cooling phase 16 in the wheel dryer 1. For regenerating the adsorbent, the regenerating air flow 6 is conducted through the heat exchanger 13 by a filter 17 and a regenerating fan 18, heated up by a heater 19, and then introduced to the wheel dryer 1. For subsequent cooling of the adsorbent, a part of the drying air flow 12 is branched off as air flow 7 for the cooling and introduced to the wheel dryer 1.

The drying or dehumidifying phase 14 for the exhaust air flow 5 is carried out in a continuous manner during the operation. Preferably, the cooling phase 16 of the adsorbent is also carried out in a continuous manner during the operation in parallel to the drying or dehumidifying phase 14. The regenerating phase 15 with the adsorbent heating is carried out at intervals during the operation.

As mentioned already, zeolite requires a temperature of more than 200° C. for regenerating, thus for dehumidifying and drying. Depending on temperature, time and air flow, a specific cost of energy is therefore necessary for regenerating a certain amount of zeolite. As a result, the optimal energy consumption can be determined based on the degree of humidity of the zeolite. Thus, an energy supply in excess of the saturation range does not result in any significantly better efficiency and is a waste of energy.

As is furthermore generally known, the energy consumption of the drying process in the drying or dehumidifying phase 14 is determined very much by the heating output in the regenerating phase 15.

In accordance with the philosophy underlying this invention, namely to at least maintain the quality standard of the drying air but increase the economic efficiency, a difference between heavily and less heavily loaded drying tasks is deliberately made in the drying method. Pursuant to the present method in accordance with the invention, the regenerating phase for less heavily loaded drying tasks is carried out at intervals during the operation as a result of this conclusion. This means that the heater 19 for heating the adsorbent and, where applicable, the associated fan are switched off deliberately for a period of time. With this type of operation at intervals, the curve for the dew point deviates only insignificantly from the ideal curve, whereby however the deviation for the quality standard is unnoticeable.

By deliberately designing that the region for the regenerating phase 15 is at least equal to, however preferably greater than the region for the cooling phase 16, the heater 19 or the regenerating fan 18 can be switched off during operation of the cooling phase 16 and the drying process phase of the adsorbent.

In a preferred embodiment, described later in more detail, in which the regenerating region is formed to be at least double the size of the cooling region, the regenerating phase 15 can be shut down every second cooling period, as a result of which a saving of 50% of energy is achieved.

The wheel dryer 1 is always stopped in the cooling 16 or regenerating phase 15 and advanced to the cooling region after the cooling 16 or regenerating phase 15 finishes. Both the cooling 16 as well as the drying or dehumidifying phase 14 is in operation during the standstill of the wheel dryer 1.

Figure 2:
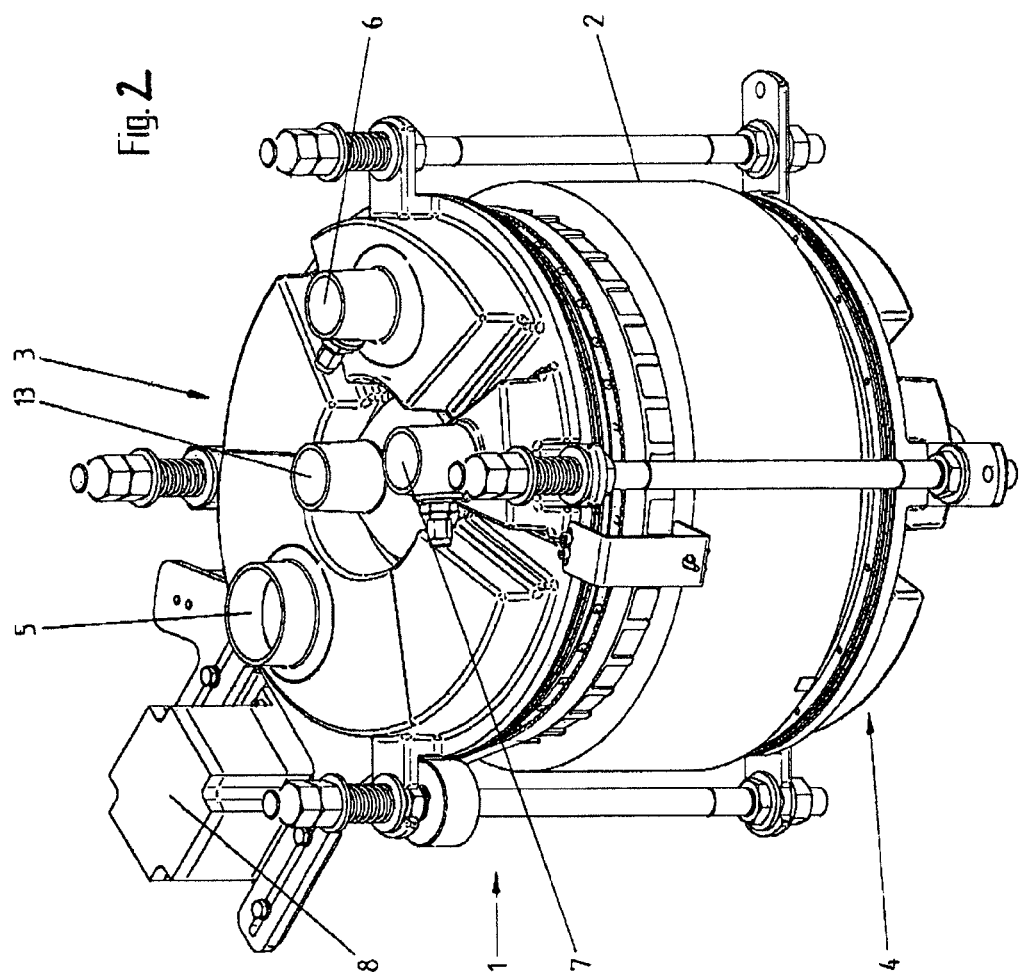
FIG. 2 a view of a wheel dryer.

According to FIG. 2, the wheel dryer 1 includes a rotatable drum 2 provided with one lid 3, 4 each at both axial ends, in which each lid 3, 4 includes the connections for the air conducts 5, 6, 7. The drum 2 is rotatable using a belt drive through a drive motor 8, such that the two lids 3, 4 are stationary. The central region of the wheel dryer 1 is designed as hollow shaft and has the function of a heat exchanger 13.

The wheel dryer 1 forms part of a device for drying bulk goods, in particular solids, such as granular materials, powders, grains, films, shreds, or the like, preferably plastic granular material. The device furthermore includes a drying silo 9, through which an air flow flows. The air conduction is illustrated schematically in FIG. 1. In order to dry, during the drying or dehumidifying phase 14, the exhaust air flow 5 or the returning air exiting the drying silo 9, the exhaust air flow 5 is connected by a filter 10 and a process fan 11 to the wheel dryer 1 that contains a drying or adsorbing agent. The exhaust air flow 5 is dried in the wheel dryer 1. The exhaust air flow 5 is reintroduced to the drying silo 9 as drying air flow 12.

The adsorbing agent is regenerated in the regenerating phase 15 and subsequently cooled in the cooling phase 16 in the wheel dryer 1. For regenerating the adsorbent, the regenerating air flow 6 is conducted through the heat exchanger 13 by a filter 17 and a regenerating fan 18, heated up by a heater 19, and then introduced to the wheel dryer 1. For subsequent cooling of the adsorbent, a part of the drying air flow 12 is branched off as air flow 7 for the cooling and introduced to the wheel dryer 1.

Figure 3:
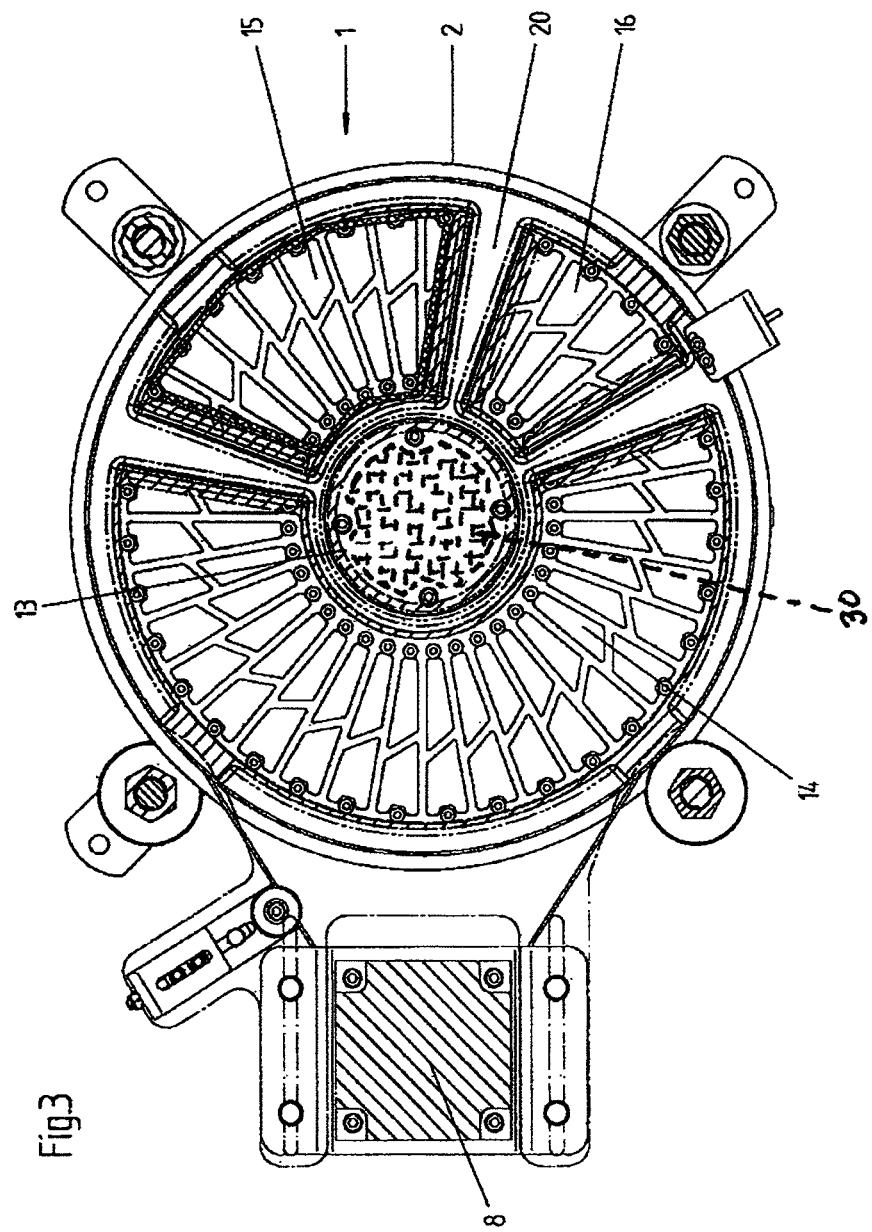
FIG. 3 a top view of the wheel dryer with removed lid.

According to FIG. 3, the wheel dryer 1 is shown open at the top, thus without lid 3. The drum 2 is rotated or advanced by the drive motor 8 and the belt drive. The wheel dryer 1 or the drum 2 is divided into at least three wheel segments, such that the region of one wheel segment serves for drying or dehumidifying the exhaust air flow 5. Thus, the drying or dehumidifying phase 14, the region of the second wheel segment serves for heating the adsorbent, the regenerating phase 15, and the region of the third wheel segment serves for cooling the adsorbent, the cooling phase 16. The heat exchanger 13 is in the central region of the wheel dryer 1. A wire cloth or stainless steel wool or the like 30 can be provided in the hollow shaft designed as heat exchanger 13. The drying or dehumidifying region amounts to approximately 240 arc degrees, the heating region amounts to approximately 80 arc degrees and the cooling region amounts to approximately 40 arc degrees.

A rotor disk with a seal 20, in particular a sandwich seal, which serves as elastic compensating element, is provided between the lids 3, 4 and the rotating drum 2.

Figure 4:
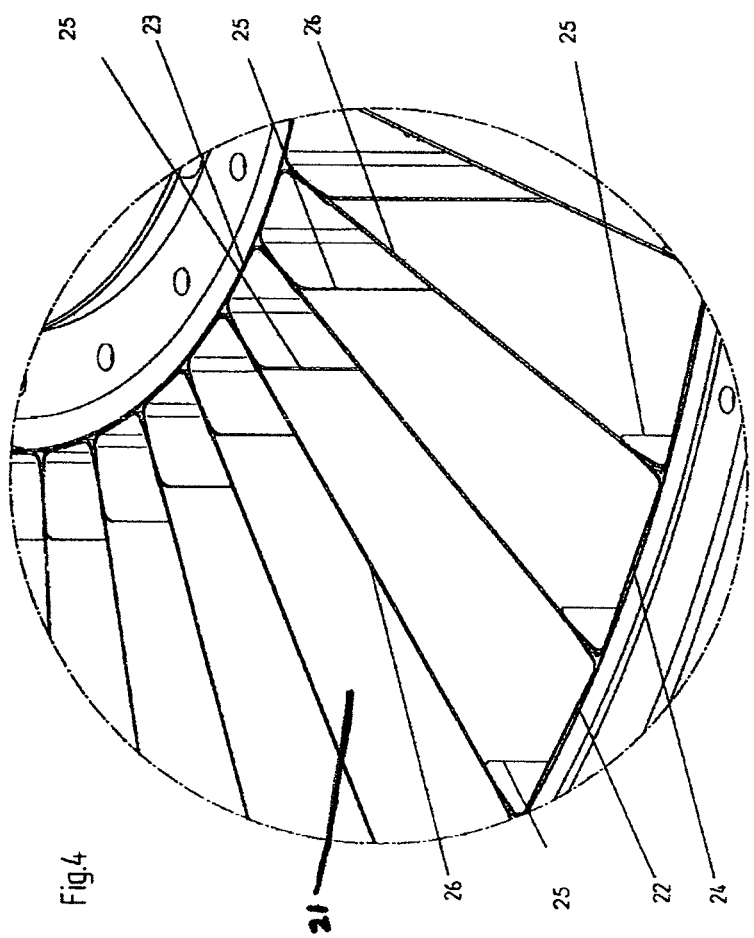
FIG. 4 a section with cells of a drum of the wheel dryer.

According to FIG. 4, the inner mechanism of the drum 2 is shown in a detailed view. The drum 2 is divided into individual cells 21. The individual cells 21 of the drum 2 of the wheel dryer 1 are formed by plates. Clamping plates 24 having a U-shaped cross-section lie against the radial outer and inner jackets 22, 23 of the drum 2. The clamping plates 24 are arranged axially on the inner wall of the drum 2, thus against the outer jacket 22 and the inner jacket 23. The legs 25 of the U-shaped clamping plates 24 are tilted outwardly, so that they press against the adjacent legs 25 of the adjacent clamping plate 24 with tensile force after they are placed in the drum 2. Separating plates 26 are provided as partitions of the individual cells 21. The separating plates 26 are positioned by the clamping effect of adjacent legs 25 of two U-shaped clamping plates 24 lying against each other and seal off the cells from each other. In the exemplary embodiment, an amount of 36 cells are provided. Naturally, also three, for the three phases, or six cells 21 would be conceivable in an extreme case.

Figure 5:
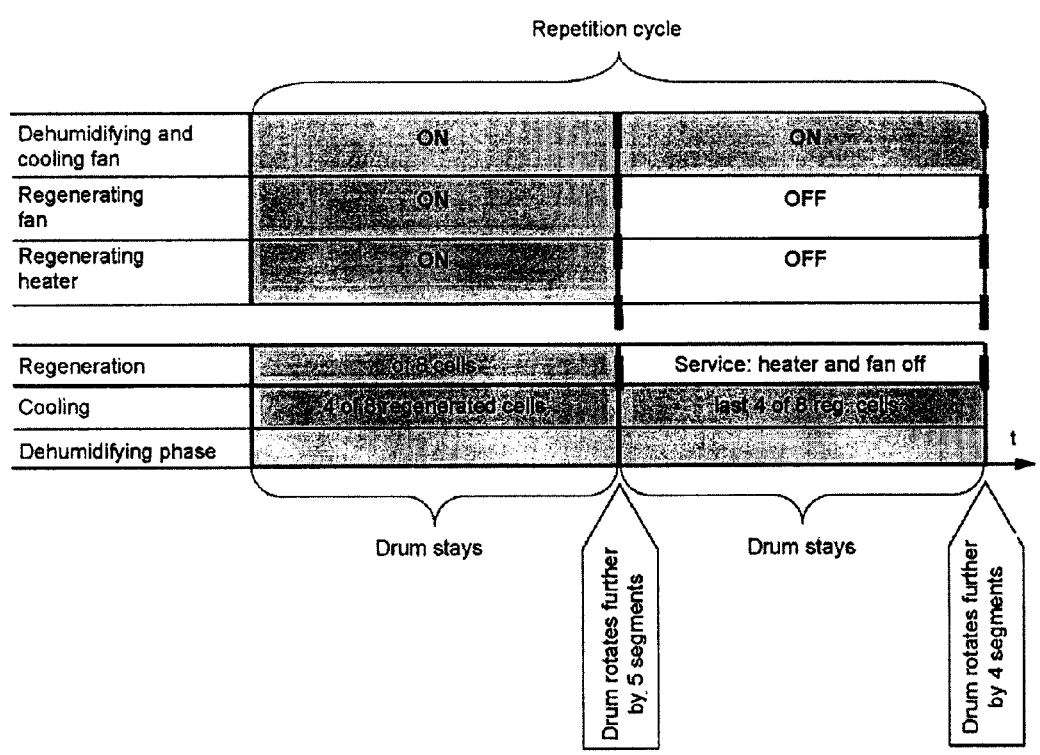
FIG. 5 shows a table illustrating a process for a drum with thirty-six cells in accordance with aspects of the disclosure.

This process is illustrated for a drum 2 with 36 cells 21 in accordance with FIG. 5.

The advance cycle of the drum 2 once by five and the next by four cells 21 results from the fact that the bordering cells between the individual phases in the drum 2 are not located in the active zone (see FIG. 3).

The invention claimed is:

1. A method for drying bulk goods in a drying silo with an air flow, the method comprising:
   drying in a wheel dryer having a drying or adsorbing agent at least one of exhaust air flow discharged from the drying silo or returning air flow from the wheel dryer in a dehumidification phase;
   reintroducing the dried at least one of exhaust air flow or returning air flow to the bulk goods as drying air flow;
   regenerating the drying or adsorbing agent in the wheel dryer in a regeneration phase; and
   cooling the drying or adsorbing agent in the wheel dryer in a cooling phase,
   wherein the wheel dryer comprises a region for one of drying or dehumidifying the exhaust air flow for the dehumidification phase, a region for heating the drying or adsorbing agent for the regeneration phase, and a region for cooling the drying or adsorbing agent for the cooling phase, and the wheel dryer includes a rotatable drum divided into a plurality of cells that are selectively positionable in one of: the region for one of drying or dehumidifying the exhaust air flow for the dehumidification phase, the region for heating the drying or adsorbing agent for the regeneration phase, and the region for cooling the drying or adsorbing agent for the cooling phase, wherein the region for heating is at least as large as the region for cooling, and
   wherein the dehumidification phase and the cooling phase occur in parallel in a continuous manner during operation, and the regeneration phase occurs in an intermittent manner during operation, such that the regeneration phase is not in operation for a group of cells that have already been subjected to the regeneration phase but still remain in the region for heating.

2. A method for drying bulk goods in a drying silo with an air flow, the method comprising:
   drying in a wheel dryer having a drying or adsorbing agent at least one of exhaust air flow discharged from the drying silo or returning air flow from the wheel dryer in a dehumidification phase;
   reintroducing the dried at least one of exhaust air flow or returning air flow to the bulk goods as drying air flow;
   regenerating the drying or adsorbing agent in the wheel dryer in a regeneration phase; and
   cooling the drying or adsorbing agent in the wheel dryer in a cooling phase,
   wherein the wheel dryer comprises a region for one of drying or dehumidifying the exhaust air flow for the dehumidification phase, a region for heating the drying or adsorbing agent for the regeneration phase, and a region for cooling the drying or adsorbing agent for the cooling phase, and
   wherein the wheel dryer includes a rotatable drum divided into a plurality of cells that are selectively positionable in one of: the region for one of drying or dehumidifying the exhaust air flow for the dehumidification phase, the region for heating the drying or adsorbing agent for the regeneration phase, and the region for cooling the drying or adsorbing agent for the cooling phase, wherein the region for heating is at least as large as the region for cooling, and
   wherein after a particular group of cells completes a particular regeneration phase, the drum is rotated in a first discrete movement to move a first subgroup of cells of the group of cells into the region for cooling and stopped to subject the first subgroup to the cooling phase, and subsequently, the drum is rotated in a second discrete movement to move a second subgroup of cells of the group of cells into the region for cooling and stopped to subject the second subgroup to the cooling phase, and
   wherein while the first subgroup is subjected to the cooling phase, the regeneration phase is not in operation for cells currently arranged within the region for heating the drying or adsorbing agent.

3. The method in accordance with claim 2, wherein the bulk goods comprise at least one of granular materials, powders, grains, films, shreds, or plastic granular material.

4. The method in accordance with claim 2, wherein drying of the at least one of exhaust air flow or returning air flow, and cooling of the drying or adsorbing agent is performed in a parallel and continuous manner during operation.

5. The method in accordance with claim 2, wherein the drying or dehumidifying region comprises approximately 240 arc degrees, the heating region comprises approximately 80 arc degrees and the cooling region comprises approximately 40 arc degrees.

6. The method in accordance with claim 2, further comprising branching off a portion of the dried exhaust air as an air flow for cooling the drying or adsorbing agent.

7. The method in accordance with claim 2, wherein the wheel dryer comprises a hollow shaft in a central region formed as a heat exchanger, and the method further comprises:
   producing a regeneration air flow for regenerating the drying or adsorbing agent; and
   conducting the regeneration air flow through the hollow shaft before entry into the wheel dryer.

8. The method in accordance with claim 2, wherein the individual cells are formed by radial partitions.

9. A device for drying bulk goods in a drying silo with an air flow according to the method of claim 2, the device comprising:
   a radial outer jacket and a radial inner jacket being arranged to define an interior of the rotatable drum;
   the plurality of individual cells formed in the interior of the rotatable drum by separating plates and clamping plates;
   the clamping plates of each cell being arranged against the radial outer jacket and the radial inner jacket and having a U-shaped cross-section, the clamping plates arranged against the radial inner jacket being arranged axially so that legs of the U-shaped clamping plates are tilted outwardly; and
   the separating plates being arranged as partitions to define the individual cells and to be secured by a clamping effect between adjacent legs of two U-shaped clamping plates lying against each other and to seal off the cells from each other.

10. The device in accordance with claim 9, wherein the plurality of individual cells comprise at least three cells.

11. The device in accordance with claim 10, wherein the plurality of individual cells comprises six cells.

12. The device in accordance with claim 10, wherein the plurality of individual cells comprises thirty-six cells.

13. The device in accordance with claim 9, wherein the wheel dryer comprises a lid arranged at each axial end, and each lid comprises connections for receiving air flows.

14. The device in accordance with claim 13, wherein the lids are structured and arranged to be stationary, and a rotor disk with a seal is arranged between the lids and the rotating drum.

15. The device in accordance with claim 9, wherein the wheel dryer comprises a hollow shaft in a central region structured and arranged as heat exchanger.

16. The device in accordance with claim 15, further comprising at least one of wire cloth or stainless steel wool within the hollow shaft.

17. A device for drying bulk goods, the device comprising:
a wheel dryer comprising a rotating drum and an adsorbent, the wheel dryer being structured and arranged to regenerate the adsorbent and to cool the adsorbent;
the rotating drum having an inner wall and an outer wall and being divided into a plurality of angularly discrete regions arranged to form at least: a region for one of drying or dehumidifying an exhaust air flow from a silo for drying the bulk goods, a region for heating the adsorbent, and a region for cooling the adsorbent;
the wheel dryer being divided into a plurality of cells radially extending from the inner wall to the outer wall, each cell being defined by separating plates and clamping plates;
the clamping plates having a U-shaped cross-section and being coupled to one of the inner wall and the outer wall, and the separating plates being clamped between and in direct physical contact with legs of adjacent clamping plates; and
air connections connected at axial ends of the wheel dryer to receive air flows into the wheel dryer or to expel air flows from the drying wheel.

18. The device according to claim 17, wherein the wheel dryer comprises a hollow shaft in a central region formed as a heat exchanger.

* * * * *